(12) United States Patent
Liang et al.

(10) Patent No.: US 12,107,224 B2
(45) Date of Patent: Oct. 1, 2024

(54) ELECTROLYTE FOR LITHIUM-ION BATTERY, LITHIUM-ION BATTERY, BATTERY MODULE, BATTERY PACK, AND APPARATUS

(71) Applicant: CONTEMPORARY AMPEREX TECHNOLOGY CO., LIMITED, Ningde (CN)

(72) Inventors: Chengdu Liang, Ningde (CN); Chengyong Liu, Ningde (CN); Yongsheng Guo, Ningde (CN); Quan Fan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 361 days.

(21) Appl. No.: 17/620,336

(22) PCT Filed: Nov. 27, 2019

(86) PCT No.: PCT/CN2019/121316
§ 371 (c)(1),
(2) Date: Dec. 17, 2021

(87) PCT Pub. No.: WO2021/102747
PCT Pub. Date: Jun. 3, 2021

(65) Prior Publication Data
US 2022/0376298 A1    Nov. 24, 2022

(51) Int. Cl.
| | |
|---|---|
| H01M 10/0567 | (2010.01) |
| H01M 4/02 | (2006.01) |
| H01M 4/505 | (2010.01) |
| H01M 4/525 | (2010.01) |
| H01M 10/0525 | (2010.01) |
| H01M 10/0568 | (2010.01) |
| H01M 10/42 | (2006.01) |
| H01M 50/46 | (2021.01) |

(52) U.S. Cl.
CPC ....... *H01M 10/0567* (2013.01); *H01M 4/505* (2013.01); *H01M 4/525* (2013.01); *H01M 10/0525* (2013.01); *H01M 10/0568* (2013.01); *H01M 10/4235* (2013.01); *H01M 50/46* (2021.01); *H01M 2004/028* (2013.01); *H01M 2220/20* (2013.01); *H01M 2300/0025* (2013.01)

(58) Field of Classification Search
None
See application file for complete search history.

(56) References Cited

U.S. PATENT DOCUMENTS

| 4,889,906 A | 12/1989 | Fields, Jr. et al. |
|---|---|---|
| 2007/0282120 A1 | 12/2007 | Rochlin et al. |
| 2017/0069935 A1* | 3/2017 | Choi .................. H01M 10/0568 |

FOREIGN PATENT DOCUMENTS

| CN | 102593516 A | 7/2012 |
|---|---|---|
| CN | 101654229 B | 1/2013 |
| CN | 105655641 A | 6/2016 |
| CN | 106471000 A | 3/2017 |
| CN | 107256978 A | 10/2017 |
| CN | 108365265 A | 8/2018 |
| CN | 108503670 A | 9/2018 |
| CN | 110299562 A | 10/2019 |
| EP | 3165528 A1 | 5/2017 |
| JP | 2018177670 A | 11/2018 |
| WO | 2005068480 A1 | 7/2005 |

OTHER PUBLICATIONS

Contemporary Amperex Technology Co., Limited, International Search Report with English Translation, PCT/CN2019/121316, Jul. 28, 2020, 7 pgs.
Contemporary Amperex Technology Co., Limited, CN First Office Action, CN201980063342.9, Nov. 12, 2021, 5 pgs.
Decision to Grant a Patent received in the corresponding European Application 19954355.4, mailed Nov. 11, 2022.
The extended European search report received in the corresponding European Application 19954355.4, mailed Mar. 16, 2022.
Notification to Grant Patent Right for Invention received in the corresponding Chinese Application 201980063342.9.
Written Opinion received in the corresponding international application PCT/CN2019/121316, mailed Jul. 28, 2020.
First search report received in the corresponding Chinese Application 201980063342.9.

* cited by examiner

*Primary Examiner* — Gregg Cantelmo
(74) *Attorney, Agent, or Firm* — Kilpatrick Townsend & Stockton LLP

(57) ABSTRACT

An electrolyte for a lithium-ion battery, a lithium-ion battery, a battery module, a battery pack, and an apparatus are provided. The electrolyte includes an organic solvent, an electrolyte lithium salt dissolved in the organic solvent, and an additive, where the additive is a compound represented by following formula I. The electrolyte can inhibit generation of lithium dendrites in the lithium-ion battery, improve cycle performance of the battery, and also improve flame retardancy of the battery, thereby effectively resolving defects in the existing technology.

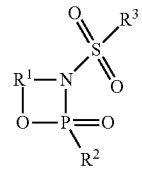

formula I

18 Claims, 3 Drawing Sheets

ELECTROLYTE FOR LITHIUM-ION BATTERY, LITHIUM-ION BATTERY, BATTERY MODULE, BATTERY PACK, AND APPARATUS

TECHNICAL FIELD

This application relates to the battery field, and in particular, to an electrolyte for a lithium-ion battery, a lithium-ion battery, a battery module, a battery pack, and an apparatus.

BACKGROUND

Currently, lithium-ion batteries have been widely applied to high-tech products such as automobiles and mobile phones. Graphite is mainly used as a negative material for commercial lithium-ion batteries, and capacity performance of the commercial lithium-ion batteries has been close to the graphite theoretical value (372 mAh/g). It is difficult to significantly increase capacities of the lithium-ion batteries through graphite processing. Lithium metal has a theoretical specific capacity up to 3860 mAh/g, and electrode potential as low as −3.04 V (vs. H2/H+). Therefore, using the lithium metal as the negative electrode to develop the lithium-ion batteries has again attracted attention of scientific researchers.

However, obstacles in the following three main aspects impose limitations on further development of the lithium-ion batteries: (1) The lithium-ion batteries are prone to generate lithium dendrites during cycling, resulting in that the batteries are prone to short-circuits; (2) the lithium dendrites have large surface areas and high activity, and are prone to fiercely react with the electrolyte to generate flammable gases such as hydrogen, alkane, and alkene; and (3) volumes greatly change in a lithium deposition or dissolution process, thereby causing continuous cracks and reorganization of SEI films on surfaces of the lithium metal, and consuming electrolyte and active lithium. The foregoing obstacles all cause reduced cycle efficiency, shortened battery cycle life, and safety risks for the lithium-ion batteries.

Therefore, how to effectively improve surface features of lithium metal electrodes, inhibit generation of the lithium dendrites, and improve flame retardancy capabilities of the batteries is a current key problem that needs to be resolved to further develop the lithium-ion batteries.

SUMMARY

Some embodiments of this application provide an electrolyte for a lithium-ion battery, a lithium-ion battery, a battery module, a battery pack, and an apparatus. The electrolyte can inhibit generation of lithium dendrites in the lithium-ion battery, improve cycle performance of the battery, and also improve flame retardancy of the battery, thereby effectively resolving defects in the existing technology.

According to a first aspect, this application provides an electrolyte for a lithium-ion battery, including an electrolyte lithium salt, an organic solvent, and an additive. The additive is a compound represented by following formula I:

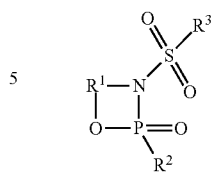

formula I $R^1$ is a C1-10 alkylidene group, and optionally, one or more hydrogen atoms in the alkylidene group may be substituted with one or more of phenyl (Ph-), halogen, nitrogen, oxygen, sulfur, silicon, boron, or phosphorus.

$R^2$ and $R^3$ each are independently selected from halogen, a saturated or unsaturated C1-10 alkyl group or alkoxy group, or an alkylamino group (such as R—$NR^4$— or —$R^1$—$NR^4R^5$), and optionally, one or more hydrogen atoms in the saturated or unsaturated alkyl group or alkoxy group, or the alkylamino group may be substituted with one or more of halogen, nitrogen, oxygen, sulfur, silicon, boron, or phosphorus.

R is a saturated or unsaturated C1-10 alkyl group, and optionally, one or more hydrogen atoms in the saturated or unsaturated alkyl group may be substituted with one or more of halogen, nitrogen, oxygen, sulfur, silicon, boron, or phosphorus.

$R^4$ and $R^5$ each are independently selected from H or halogen.

According to a second aspect, this application provides a lithium-ion battery, including a positive electrode, a negative electrode, a separator provided between the positive electrode and the negative electrode, and the electrolyte according to the first aspect of this application.

According to a third aspect, this application further provides a battery module, including the lithium-ion battery according to the second aspect of this application.

According to a fourth aspect, this application further provides a battery pack, including the battery module according to the third aspect of this application.

According to a fifth aspect, this application further provides an apparatus, including the lithium-ion battery according to the second aspect of this application, where the lithium-ion battery is used as a power supply for the apparatus.

In this application, the compound represented by formula I is added as an additive to the electrolyte of the lithium-ion battery, and because the compound includes a sulfonyl group, an interface film including an element content such as P, S, N, or F can be formed on surfaces of the positive and negative electrodes. The interface film has good ion conductivity, and can inhibit generation of the lithium dendrites in the lithium-ion battery, which is conducive to reduction of impedance of the lithium-ion battery and can inhibit excessive side reactions between the positive and negative electrodes and the electrolyte, thereby improving cycle performance of the battery. In addition, the additive also has flame retardancy, and therefore, safety performance of the electrolyte and the lithium-ion battery can be improved.

BRIEF DESCRIPTION OF DRAWINGS

The following further describes this application in detail with reference to the accompanying drawings.

Figure 1:
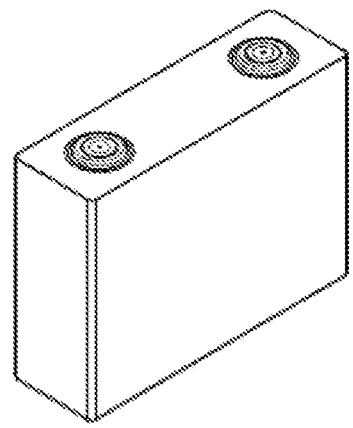
FIG. 1 is a three-dimensional diagram of a lithium-ion battery according to an embodiment of this application.

Reference signs are described as follows:
1. battery pack
2. upper box body
3. lower box body
4. battery module
5. battery cell
51. housing
52. electrode assembly
53. top cover assembly

DESCRIPTION OF EMBODIMENTS

The following describes in detail an electrolyte for a lithium-ion battery, a lithium-ion battery, a battery module, a battery pack, and an apparatus according to this application.

For simplicity, only examples of some numerical ranges are disclosed in this specification. However, any lower limit may be combined with any other upper limit to form a range not expressly recorded; any lower limit may be combined with another lower limit to form a range not expressly recorded; and similarly, any upper limit may be combined with any other upper limit to form a range not expressly recorded. In addition, although not expressly recorded, each point or individual value between endpoints of a range is included in the range. Therefore, each point or individual value may be used as its own lower limit or upper limit and be combined with any other point or individual value or combined with another lower limit or upper limit to form a range not expressly recorded. It should be understood that enumeration of values is used only as an example and should not be interpreted as exhaustive.

In descriptions of this specification, it should be noted that, unless otherwise specified, "above", "below", "≤", and "≥" a number means inclusion of the number itself, "at least one" means one or more, and "more" in "one or more" means two or more.

Electrolyte

The following describes in detail the electrolyte for a lithium-ion battery according to the first aspect of this application.

The electrolyte for a lithium-ion battery according to the first aspect of this application includes an electrolyte lithium salt, an organic solvent, and an additive. The additive is a compound represented by following formula I:

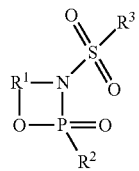

formula I $R^1$ is a C1-10 alkylidene group, and optionally, one or more hydrogen atoms in the alkylidene group may be substituted with one or more of phenyl (Ph-), halogen, nitrogen, oxygen, sulfur, silicon, boron, or phosphorus.

$R^2$ and $R^3$ each are independently selected from halogen, a saturated or unsaturated C1-10 alkyl group or alkoxy group, or an alkylamino group (such as R—$NR^4$— or —$R^1$—$NR^4R^5$), and optionally, one or more hydrogen atoms in the saturated or unsaturated alkyl group or alkoxy group, or the alkylamino group may be substituted with one or more of halogen, nitrogen, oxygen, sulfur, silicon, boron, or phosphorus.

R is a saturated or unsaturated C1-10 alkyl group, and optionally, one or more hydrogen atoms in the saturated or unsaturated alkyl group may be substituted with one or more of halogen, nitrogen, oxygen, sulfur, silicon, boron, or phosphorus.

$R^4$ and $R^5$ each are independently selected from H or halogen.

In an embodiment of this application, the halogen is selected from fluorine, chlorine, bromine, or iodine.

In an embodiment of this application, $R^1$ is selected from a C1-4 alkylidene group, and optionally, one or more hydrogen atoms in the alkylidene group may be substituted with one or more of phenyl, fluorine, chlorine, bromine, iodine, nitrogen, oxygen, sulfur, silicon, boron, or phosphorus.

In an embodiment of this application, $R^1$ is selected from —$CH_2$—, —$CH_2CH_2$—, —$CH_2CH_2CH_2$—, or —$CH_2(CH_2)_2CH_2$—, and optionally, one or more hydrogen atoms in these groups may be substituted with one or more of phenyl, fluorine, chlorine, bromine, iodine, nitrogen, oxygen, sulfur, silicon, boron, or phosphorus.

In an embodiment of this application, $R^1$ is selected from —$CH_2$—, —$CH_2CH_2$—, —$CH_2CH_2CH_2$—, —$CH_2(CH_2)_2CH_2$—, or —$CH_2$—CHPh-.

In an embodiment of this application, $R^2$ and $R^3$ each are independently selected from F, Cl, Br, or a C1-4 alkyl group or alkoxy group, and optionally, one or more hydrogen atoms in the alkyl group or the alkoxy group may be substituted with one or more of fluorine, chlorine, bromine, iodine, nitrogen, oxygen, sulfur, silicon, boron, or phosphorus.

In an embodiment of this application, $R^2$ and $R^3$ each are independently selected from F, Cl, —$CH_3$, —$CH_2CH_3$, —$CH_2CH_2CH_3$, —$CH_2(CH_2)_2CH_3$, —$OCH_3$, —$OCH_2CH_3$, —$OCH_2CH_2CH_3$, —$OCH_2(CH_2)_2CH_3$, —$CF_3$, —$CF_2CF_3$, —$CF_2CF_2CF_3$, —$CF_2(CF_2)_2CF_3$, —$CH_2CF_3$, or —$CH(CF_3)_2$.

In an embodiment of this application, $R^2$ and $R^3$ each are independently selected from R—$NR^4$— or —$R^1$—$NR^4R^5$, where R is a C1-4 alkyl group, and $R^4$ and $R^5$ each are independently selected from H, fluorine, chlorine, bromine, or iodine. For $R^1$, refer to the foregoing description.

In an embodiment of this application, $R^2$ and $R^3$ each are independently selected from R—$NR^4$— or —$R^1$—$NR^4R^5$, where R is —$CH_3$, —$CH_2CH_3$, —$CH_2CH_2CH_3$, or —$CH_2(CH_2)_2CH_3$, $R^4$ and $R^5$ each are independently selected from H, fluorine, chlorine, bromine, or iodine, and $R^1$ is selected from —$CH_2$—, —$CH_2CH_2$—, —$CH_2CH_2CH_2$—, or —$CH_2(CH_2)_2CH_2$—.

In an embodiment of this application, $R^2$ and $R^3$ each are independently selected from R—$NR^4$— or —$R^1$—$NR^4R^5$, where R is —$CH_3$, —$CH_2CH_3$, —$CH_2CH_2CH_3$, or —$CH_2(CH_2)_2CH_3$, $R^4$ and $R^5$ each are independently H, and $R^1$ is selected from —$CH_2$—, —$CH_2CH_2$—, —$CH_2CH_2CH_2$—, or —$CH_2(CH_2)_2CH_2$—.

In an embodiment of this application, $R^2$ and $R^3$ each are independently selected from $CH_3NH-$, $CF_3NH-$, $CH_3CH_2NH-$, $CH_3(CH_2)_2NH-$, $CH_3(CH_2)_2NH-$, $-CH_2NH_2$, or $-CH_2CH_2NH_2$.

In an embodiment of this application, $R^2$ is independently selected from F, Cl, $-CH_3$, $-CH_2CH_3$, $-OCH_3$, $-OCH_2CH_3$, $-CF_3$, $CH_3NH-$, or $CF_3NH-$.

In an embodiment of this application, $R^3$ is independently selected from F, Cl, $-CH_3$, $-CH_2CH_3$, $-CF_3$, $-CF_2CF_3$, $-CF_2CF_2CF_3$, $-CF_2(CF_2)_2CF_3$, $-CH_2CF_3$, or $-CH(CF_3)_2$.

In an embodiment of this application, the compound represented by formula I is selected from the following compounds:

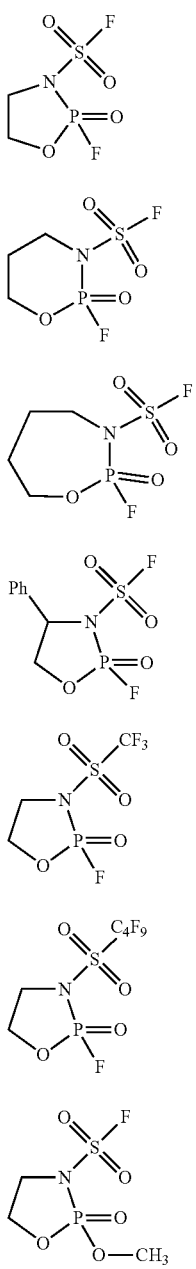

compound I-1 compound I-2 compound I-3 compound I-4 compound I-5 compound I-6 compound I-7

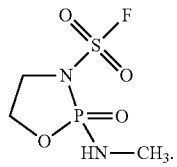

compound I-8

An experiment indicates that, in this application, the compound represented by formula I is used as an additive in an electrolyte, and in this way, an interface film including element contents such as P, S, N, and F can be formed on a surface of the electrode, continuous fierce reactions between an electrolyte solvent and materials of the lithium negative electrode and positive electrode are effectively inhibited, generation of lithium metal dendrites is slowed down, coulomb efficiency of charging and discharging of the lithium-ion battery is improved, and cycle performance of the lithium-ion battery is significantly improved. In addition, flammability of the electrolyte and the battery can also be effectively inhibited, and safety performance of the battery is improved.

In an embodiment of this application, a content of the compound that is represented by formula I and used as an additive in the electrolyte is 0.1 wt % to 15 wt %, and preferably 0.5 wt % to 10 wt %. An appropriate additive content can effectively improve flame retardancy of the electrode surfaces and the battery, and conduction of lithium ions inside the battery, and prevent polarization.

In an embodiment of this application, a content of the compound that is represented by formula I and used as an additive in the electrolyte is 0.1 wt %, 0.2 wt %, 0.3 wt %, 0.5 wt %, 0.6 wt %, 0.8 wt %, 1.0 wt %, 1.5 wt %, 2.0 wt %, 2.5 wt %, 5 wt %, 8 wt %, 10 wt %, 15 wt %, or the like, and includes any value therein and all ranges and sub-ranges. For example, the ranges and sub-ranges include but are not limited to 0.1 wt % to 15 wt %, 0.1 wt % to 10 wt %, 0.3 wt % to 15 wt %, 0.5 wt % to 15 wt %, 0.5 wt % to 15 wt %, 0.5 wt % to 10 wt %, 1.0 wt % to 15 wt %, 2.5 wt % to 10 wt %, 5 wt % to 10 wt %, or the like.

As an improvement to the electrolyte in this application, another functional additive that is known in the art and that can be configured to improve performance of the lithium-ion battery can be further added into the electrolyte, such as a solid electrolyte interface (SEI) film forming additive, a flame retardancy additive, an overcharge protection additive, or a conductive additive, such as triethyl phosphite (TEP). Details are not described herein.

An organic solvent used in this application is not limited to a specific type, and may be appropriately selected based on an actual need, provided that the technical solutions in this application can be implemented. In an example, in an embodiment of this application, the organic solvent may be selected from at least one of carbonate, carboxylic ester, sulfate, phosphate, amide, nitrile, and ether. For example, the organic solvent may be selected from one or more of ethylene carbonate (EC), fluoroethylene carbonate (FEC), propylene carbonate, dimethyl carbonate, diethyl carbonate (DEC), dipropyl carbonate, ethyl methyl carbonate (EMC), methyl formate, ethyl formate, ethyl propionate, propyl propionate, methyl butyrate, ethyl acetate, anhydride, N-methylpyrrolidone (NMP), N-methylformamide, N-methylacetamide, acetonitrile, sulfolane, dimethyl sulfoxide, vinyl sulfite, propylene sulfite, triethyl phosphate, methyl ethyl phosphite, methyl sulfide, diethyl sulfite, dimethyl sulfite, ethylene glycol dimethyl ether, diethylene glycol dimethyl ether, triethylene glycol dimethyl ether, tetraethylene glycol dimethyl ether, 1,3-dioxolane, tetrahydrofuran, fluorinated cyclic organic ester, or sulfur-containing cyclic organic ester.

The organic solvent may be a mixed solvent of two or more of the foregoing organic solvents, and a ratio thereof is not particularly limited and may be appropriately selected based on an actual need, provided that the technical solutions in this application can be implemented. For example, in an embodiment of this application, when the organic solvent includes two different organic solvents, the two different organic solvents may be mixed in a volume ratio of 1:1, 2:8, 3:7, 4:6, 8:2, 7:3, 6:4, or the like for use.

The content of the organic solvent in the electrolyte is not specifically limited, and may be appropriately selected based on an actual need, provided that the technical solutions in this application can be implemented. In an example, in an embodiment of this application, a content of the organic solvent in the electrolyte is 60 wt % to 90 wt %. Preferably, the content is 70 wt % to 80 wt %. For example, the content includes but is not limited to 65 wt %, 70 wt %, 75 wt %, 80 wt %, 85 wt %, or the like and includes any value therein and all ranges and sub-ranges.

Similarly, the electrolyte lithium salt used in this application is not specifically limited, and may be appropriately selected based on an actual need, provided that the technical solutions in this application can be implemented. In an embodiment of this application, the electrolyte lithium salt may be selected from one or more of organic lithium salts and inorganic lithium salts. For example, the electrolyte lithium salt may be selected from at least one of $LiPF_6$, $LiBF_4$, LiTFSI (lithium bistrifluoromethanesulfonimidate), LiF SI (imidodisulfuryl fluoride lithium salt), $LiClO_4$, $LiAsF_6$, $LiPO_2F_2$, LiBOB, LiDFOB, LiTFOP, $LiN(SO_2R_F)_2$, or $LiN(SO_2F)(SO_2R_F)$, where a substituent group $R_F=C_nF_{2n+1}$, and n is an integer from 1 to 10.

In an embodiment of this application, a concentration of the electrolyte lithium salt in the electrolyte is 0.5 mol/L to 10 mol/L, and preferably 1 mol/L to 5 mol/L. For example, the concentration of the electrolyte lithium salt includes but is not limited to 0.5 mol/L, 0.6 mol/L, 0.8 mol/L, 1.0 mol/L, 1.5 mol/L, 2.0 mol/L, 3 mol/L, 5 mol/L, 8 mol/L, 10 mol/L, or the like and includes any value therein and all ranges and sub-ranges.

Lithium-Ion Battery

Next, the lithium-ion battery according to the second aspect of this application is described in detail.

The lithium-ion battery according to the second aspect of this application includes a positive electrode, a negative electrode, a separator provided between the positive electrode and the negative electrode, and the electrolyte according to the first aspect of this application. The electrolyte includes the compound that is represented by formula I and used as the additive.

Figure 2:
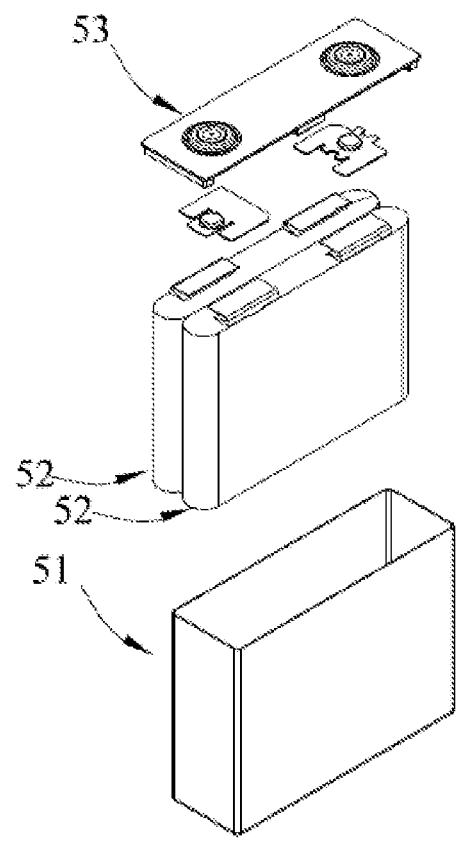
FIG. 2 is an exploded view of the lithium-ion battery shown in FIG. 1.

FIG. 1 shows a three-dimensional diagram of a lithium-ion battery according to an embodiment of this application. FIG. 2 is an exploded view of the lithium-ion battery shown in FIG. 1. Referring to FIG. 1 and FIG. 2, the lithium-ion battery 5 (referred to as a battery cell 5 hereinafter) according to this application includes a housing 51, an electrode assembly 52, a top cover assembly 53, a positive electrode, a negative electrode, a separator, and an electrolyte (not shown in the figure). The electrode assembly 52 is accommodated inside the housing 51, and a quantity of electrode assemblies 52 is not limited, and may be one or more.

It should be noted that the battery cell 5 shown in FIG. 1 is a tank-type battery, but this application is not limited thereto. The battery cell 5 may be a pouch-type battery. That is, the housing 51 is replaced by a metal plastic film and the top cover assembly 53 is eliminated.

The positive electrode of the lithium-ion battery used in this application includes a positive current collector, and a positive active substance layer provided on at least one surface of the positive current collector. For example, the positive current collector includes two opposite surfaces in its thickness direction, and the positive active substance layer is laminated on either or both of the two surfaces of the positive current collector.

The positive active substance layer contains a positive active substance, which can perform reversible deintercalation/intercalation of lithium ions during operation. In this application, the positive active substance is not limited to a particular type, and may be a positive active substance known in the art and used for lithium-ion batteries. For example, the positive active substance may be a lithium transition metal composite oxide, and the transition metal may be one or more of Mn, Fe, Ni, Co, Cr, Ti, Zn, V, Al, Zr, Ce, and Mg. The lithium transition metal composite oxide may be, for example, one or more of $LiMn_2O_4$, $LiNiO_2$, $LiCoO_2$, $LiNi_{1-y}Co_yO_2$ (0<y<1), $LiNi_mCo_nAl_{1-m-n}O_2$ (0<m<1, 0≤n<1, and 0<m+n<1), $LiNi_sCo_tMn_{1-s-t}O_2$ (0<s<1, 0≤t<1, and 0<s+t<1, for example, $LiNi_{0.8}Co_{0.1}Mn_{0.1}O_2$ (NCM 811 for short), $LiNi_{1/3}Co_{1/3}Mn_{1/3}O_2$ (NCM 111 for short), or $LiNi_{0.4}Co_{0.3}Mn_{0.3}O_2$ (NCM 433 for short), $LiNi_{0.4}Co_{0.2}Mn_{0.4}O_2$ (NCM 424 for short), $LiNi_{0.5}Co_{0.2}Mn_{0.3}O_2$ (NCM 523 for short), or $LiNi_{0.6}Co_{0.2}Mn_{0.2}O_2$ (NCM 622 for short)), $LiNi_{0.8}Co_{0.15}Al_{0.05}O_2$ (NCA for short), $LiXPO_4$ (X is selected from Fe, Mn, and Co), and $Li_3V_2(PO_4)_3$. The lithium transition metal composite oxide may be further doped with elements with high electronegativity, such as one or more of S, N, F, Br, Cl, and I. The lithium transition metal composite oxide may be further subjected to coating modification. The doping and/or coating modification can make the compound have a more stable structure and better electrochemical performance.

In an embodiment of this application, the positive active substance may include a positive active substance represented by following formula (II):

$$Li_{1+x}Ni_aCo_{1-a-b}O_{2-y}A_y \qquad (II)$$

Herein −0.1≤x≤0.2, 0<a<1, 0≤b<1, 0<a+b<1, 0≤y<0.2, M is selected from Mn, Fe, Cr, Ti, Zn, V, Al, Zr, or Ce, and A is selected from S, N, F, Cl, Br, or I.

Preferably, 0.5≤a<1, more preferably, 0.6≤a<1, M is selected from Mn and Al, and A is selected from S and F.

Optionally, the positive active substance layer may further include a conductive agent and a binder. In this application, the conductive agent and the binder in the positive active substance layer are not limited to specific types, and may be selected based on an actual need. As an example, the conductive agent may be one or more of graphite, superconducting carbon, acetylene black, carbon black, Ketjen black, carbon dots, carbon nanotubes, graphene, and carbon nanofibers. The binder may be one or more of styrene-butadiene rubber (SBR), water-borne acrylic resin (water-based acrylic resin), carboxymethyl cellulose (CMC), polyvinylidene fluoride (PVDF), polytetrafluoroethylene (PTFE), polyvinyl butyral (PVB), ethylene vinyl acetate (EVA), and polyvinyl alcohol (PVA).

The positive current collector collects and conducts a current. The positive current collector may use a metal foil or a porous metal plate, for example, a foil or a porous plate of metal such as aluminum, copper, nickel, titanium, or silver, or an alloy thereof, such as aluminum foil.

Generally, in a specific application, the positive electrode needs to be further processed into a positive electrode plate for use. A structure and a preparation method of the positive electrode plate are known in the art. For example, the positive electrode plate may be prepared in a coating manner. For example, the positive active substance, the binder, the conductive agent, and the organic solvent are first mixed in a predetermined ratio, and the mixed materials are stirred to form a homogeneous system, to obtain a positive electrode slurry; and then the positive electrode slurry is applied on the positive current collector, and after processes of drying, roll-in, and the like, the positive electrode plate is prepared.

The binder, the conductive agent, and the organic solvent (such as N-methylpyrrolidone (NMP)) are all conventional reagents used in the lithium-ion battery. Details are not described herein.

The negative electrode of the lithium-ion battery used in this application includes a negative current collector, and a negative active substance layer provided on at least one surface of the negative current collector. For example, the negative current collector includes two opposite surfaces in its thickness direction, and the negative active substance layer is laminated on either or both of the two surfaces of the negative current collector.

The negative active substance layer contains a negative active substance, where reversible deposition or dissolution, or alloying or dealloying of lithium ions can be performed during operation. The negative active substance is not limited to a particular type, and may be a negative active material known in the art and used for lithium-ion batteries. For example, the negative active substance is a lithium metal foil or a lithium alloy. The lithium alloy may be graphite or the following mixture of one or more of the materials that can be alloyed with lithium at a voltage less than 2 V (vs. Li/Li$^+$): natural graphite, artificial graphite, meso-carbon microbeads (MCMB), hard carbon, soft carbon, silicon, a silicon-carbon composite, a Li—Sn alloy, a Li—Sn—O alloy, Sn, SnO, SnO$_2$, spinel-structure lithiated TiO$_2$—Li$_4$Ti$_5$O$_{12}$, and a Li—Al alloy.

The negative current collector may use a material such as a metal foil or a porous metal plate, for example, a foil or a porous plate of metal such as copper, nickel, titanium, or iron, or an alloy thereof, such as copper foil.

Similarly, in a specific application, the negative electrode needs to be further processed into a negative electrode plate for use. A structure and a preparation method of the negative electrode plate are known in the art. For example, the negative electrode plate can make lithium metal form on the negative current collector through at least one of mechanical roll-in, a vapor deposition method, and electroless plating. The vapor deposition method is, for example, a physical vapor deposition method. The physical vapor deposition method may be at least one of an evaporation method and a sputtering method, for example, at least one of a vacuum evaporation method, a thermal evaporation method, an electron beam evaporation method, and a magnetron sputtering method. Alternatively, the negative electrode plate was prepared in a coating manner. For example, the negative active substance, the binder, the conductive agent, and a solvent were first mixed in a predetermined ratio, the solvent may be N-methylpyrrolidone or water, and a mixed material was stirred to form a homogeneous system, to obtain a negative electrode slurry; and then the negative electrode slurry was applied on the negative current collector, and after processes of drying, roll-in, and the like, the negative electrode plate was prepared. The conductive agent and the binder in the positive active substance layer are not limited to specific types, and may be selected based on an actual need.

The separator of the lithium-ion battery used in this application is not particularly limited, and any known porous separator with electrochemical stability and chemical stability may be selected, for example, a mono-layer or multi-layer membrane of one or more of glass fiber, non-woven fabric, polyethylene (PE), polypropylene (PP), and polyvinylidene fluoride (PVDF).

The positive electrode plate and the negative electrode plate are stacked alternately, the separator is provided between the positive electrode plate and the negative electrode plate to separate the positive electrode from the negative electrode, and a battery cell is obtained, or the battery core may be obtained after winding. The battery core is placed in a housing, the electrolyte is injected, an opening is sealed, and in this way, the lithium-ion battery is obtained.

Battery Module

Next, the battery module according to the third aspect of this application is briefly described.

Figure 3:
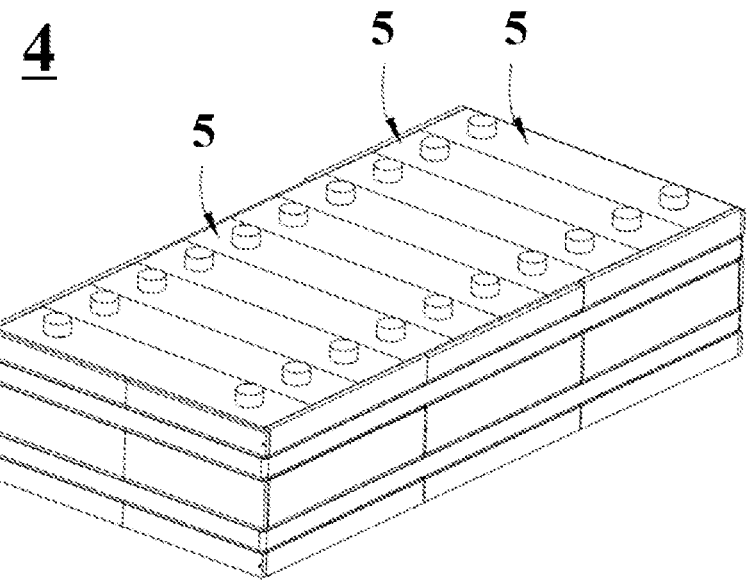
FIG. 3 is a three-dimensional diagram of a battery module according to an embodiment of this application.

FIG. 3 shows a three-dimensional diagram of a battery module according to an embodiment of this application. Referring to FIG. 3, the battery module 4 according to this application includes a plurality of battery cells 5, and the plurality of battery cells 5 are arranged in a vertical direction.

The battery module 4 may be used as a power supply or an energy storage apparatus. A quantity of battery cells 5 in the battery module 4 may be adjusted based on application and a capacity of the battery module 4.

Battery Pack

Next, the battery pack according to the fourth aspect of this application is briefly described.

Figure 4:
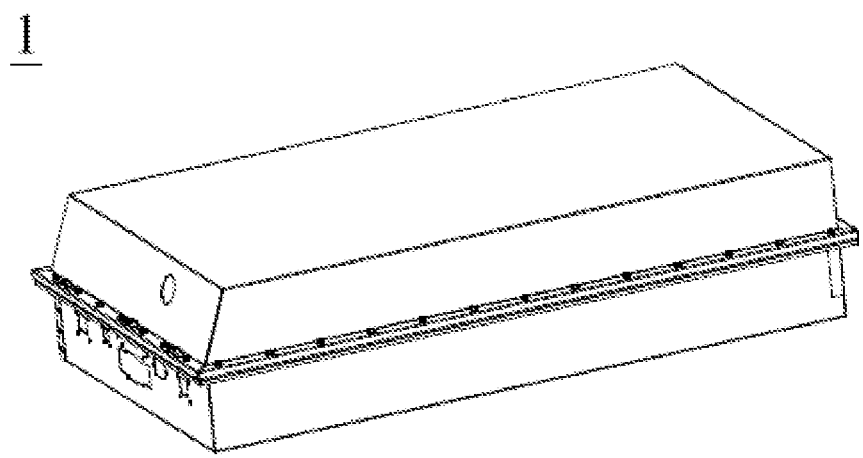
FIG. 4 is a three-dimensional diagram of a battery pack according to an embodiment of this application.
Figure 5:
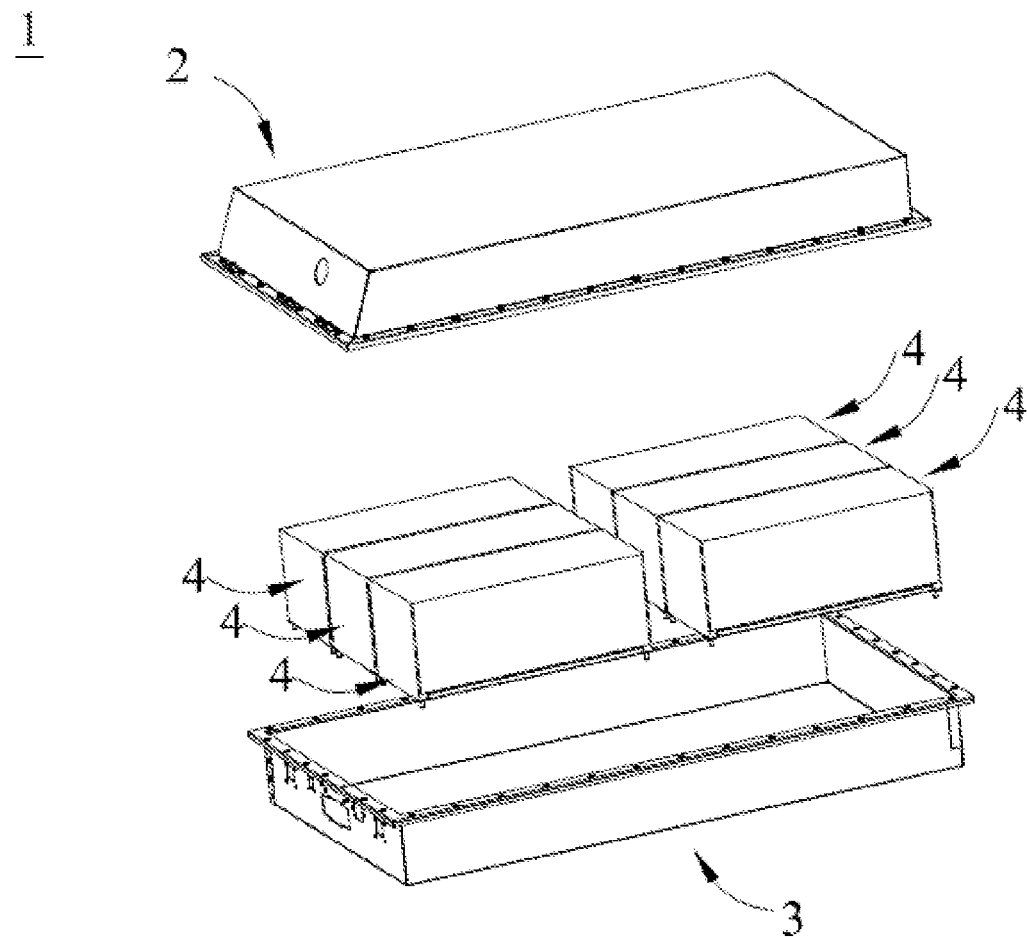
FIG. 5 is an exploded view of the battery pack shown in FIG. 4.

FIG. 4 shows a three-dimensional diagram of a battery pack according to an embodiment of this application. FIG. 5 is an exploded view of the battery pack shown in FIG. 4. Referring to FIG. 4 and FIG. 5, the battery pack 1 according to this application includes an upper box body 2, a lower box body 3, and a battery module 4. The upper box body 2 and the lower box body 3 are assembled together to form a space for accommodating the battery module 4. The battery module 4 is disposed in the space formed by the upper box body 2 and the lower box body 3 that are assembled together.

An output electrode of the battery module 4 extends from one or both of the upper box body 2 and the lower box body 3 to supply power to an outside or be charged from the outside.

It should be noted that the quantity and arrangement of battery modules 4 used in the battery pack 1 may be determined based on an actual need. The battery pack 1 may be used as a power supply or an energy storage apparatus.

Apparatus

Next, the apparatus according to the fifth aspect of this application is briefly described.

Figure 6:
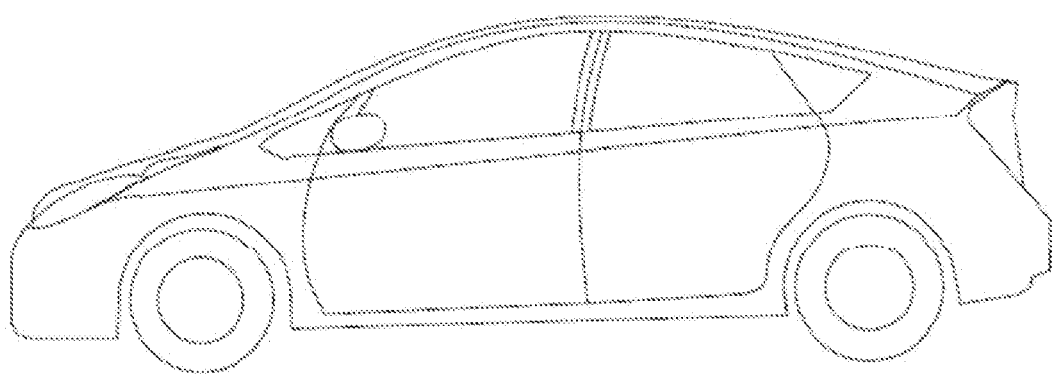
FIG. 6 is a schematic diagram of a lithium-ion battery used as a power supply apparatus according to an embodiment of this application.

FIG. 6 shows a schematic diagram of a lithium-ion battery used as a power supply apparatus according to IG. 6, an apparatus that uses the battery cell 5 is an electric car. Certainly, the apparatus that uses the battery cell 5 is not limited thereto, and may be, in addition to the electric cars, any electric vehicle (for example, an electric bus, an electric tram, an electric bicycle, an electric motorcycle, an electric scooter, an electric golf cart, or an electric truck), an electric vessel, an electric tool, an electronic device, and an energy storage system.

The electric car may be a battery electric vehicle, a hybrid electric vehicle, a plug-in hybrid electric vehicle. Certainly, depending on an actual use form, the apparatus provided in the fifth aspect of this application may include the battery module 4 in the third aspect of this application. Certainly, the apparatus provided in the fifth aspect of this application may alternatively include the battery pack 1 in the fourth aspect of this application.

EXAMPLES

The following further describes this application with reference to specific examples. It should be understood that the following examples are only used for illustration and are not intended to limit this application. Unless otherwise stated, all reagents used in the examples are commercially available or synthesized in a conventional method, and may be used directly without further processing. An experimental condition not specified in the examples is a conventional condition, or a condition recommended by a material supplier or a device supplier.

Examples 1 to 18

Based on the following method and specific parameters in Table 1, preparation in Examples 1 to 18 of this application was performed.

(1) Preparation of an Electrolyte

An organic solvent was prepared in a drying room, then an electrolyte lithium salt and an additive in this application were added to the organic solvent, and mixed evenly, and the electrolyte was obtained.

(2) Preparation of a Positive Electrode Plate

Lithium nickel cobalt manganate ($LiNi_{0.8}Co_{0.1}Mn_{0.1}O_2$, NCM 811) as a positive active material, a binder PVDF, and a conductive agent of acetylene black were mixed in a mass ratio of 98:1:1, and an organic solvent of N-methylpyrrolidone (NMP) was added until a system became homogeneous and transparent. Then the mixture was stirred by a vacuum stirrer, and an electrode active material slurry was prepared. The slurry was uniformly applied on an aluminum foil (in thickness of 12 μm), and dried at room temperature. Then the aluminum foil was transferred to an oven for drying at 120° C. for 1 hour, followed by cold pressing, and cutting to obtain a positive electrode plate.

(3) Preparation of a Negative Electrode Plate

A lithium metal of 25 μm was attached to a surface of a copper foil, followed by cold pressing, and cutting to obtain a negative electrode plate.

(4) Preparation of a Soft-Package Battery

A polypropylene film (PP) in thickness of 12 μm was used as a separator, the foregoing prepared positive electrode plate, the separator, and the negative electrode plate were stacked in sequence, so that the separator was between the positive electrode plate and the negative electrode plate for separation. Then, they were wrapped from the outside by an aluminum-plastic film and transferred to a vacuum oven for drying at 120° C. Later, the foregoing prepared electrolyte was injected, and an injection mass of the electrolyte was 1.7 g/Ah. The opening was sealed, and a soft package battery with a capacity of 1 Ah (that is, the lithium-ion battery) was prepared.

Comparative Examples 1 and 2

A lithium-ion battery in Comparative Examples 1 and 2 was prepared based on the foregoing method. A difference is that there is no additive in an electrolyte in Comparative Examples 1 and 2.

TABLE 1

Preparation parameters of lithium-ion batteries in Examples 1 to 18 and Comparative Examples 1 and 2

| | Electrolyte | | | | Positive |
| --- | --- | --- | --- | --- | --- |
| Number | Lithium salt and concentration | Organic solvent and volume ratio | Additive and content | Other additives and content | electrode plate Positive electrode Active substance |
| Example 1 | 1M LiFSI | EC/EMC (3:7) | 5 wt % I-1 | / | NCM 811 |
| Example 2 | 1M LiFSI | EC/EMC (3:7) | 0.1 wt % I-1 | / | NCM 811 |
| Example 3 | 1M LiFSI | EC/EMC (3:7) | 1.0 wt % I-1 | / | NCM 811 |
| Example 4 | 1M LiFSI | EC/EMC (3:7) | 10.0 wt % I-1 | / | NCM 811 |
| Example 5 | 1M LiFSI | EC/EMC (3:7) | 15.0 wt % I-1 | / | NCM 811 |
| Example 6 | 2M LiFSI | EC/EMC (3:7) | 5 wt % I-1 | / | NCM 811 |
| Example 7 | 1M LiFSI | EC/EMC (3:7) | 5 wt % I-1 | 2 wt % TEP | NCM 811 |
| Example 8 | 1M LiFSI | FEC/EC/EMC (1:2:7) | 5 wt % I-1 | / | NCM 811 |
| Example 9 | 1M LiFSI | EC/EMC (3:7) | 5 wt % I-2 | / | NCM 811 |
| Example 10 | 1M LiFSI | EC/EMC (3:7) | 5 wt % I-3 | / | NCM 811 |
| Example 11 | 1M LiFSI | EC/EMC (3:7) | 5 wt % I-4 | / | NCM 811 |
| Example 12 | 1M LiFSI | EC/EMC (3:7) | 5 wt % I-5 | / | NCM 811 |
| Example 13 | 1M LiFSI | EC/EMC (3:7) | 5 wt % I-6 | / | NCM 811 |
| Example 14 | 1M LiFSI | EC/EMC (3:7) | 5 wt % I-7 | / | NCM 811 |
| Example 15 | 1M LiFSI | EC/EMC (3:7) | 5 wt % I-8 | / | NCM 811 |
| Example 16 | 1M $LiPF_6$ | EC/EMC (3:7) | 5 wt % I-1 | / | $LiFePO_4$ |
| Example 17 | 0.5M LiFSI/ 0.5M LiTFSI | EC/EMC (3:7) | 5 wt % I-1 | / | $LiCoO_2$ |
| Example 18 | 1M $LiClO_4$ | EC/EMC (3:7) | 5 wt % I-1 | / | NCA |
| Comparative Example 1 | 1M LiFSI | EC/EMC (3:7) | / | / | NCM 811 |
| Comparative Example 2 | 1M LiFSI | FEC/EC/EMC (1:2:7) | / | / | NCM 811 |

I. Performance Test of an Electrolyte
1. Measurement of Electrolyte Conductivity An electrochemical workstation from Solartron Analytical was used to measure the electrolyte conductivity. A to-be-measured electrolyte sample was added to a platinum black conductivity cell (a conductivity cell constant was approximately 10 cm$^{-1}$, which was accurately calibrated by using a 0.1 mol/L standard KCl solution) in a glove box, the platinum black conductivity cell was sealed, and then an impedance curve was measured in an electrochemical impedance spectroscopy (EIS) method. A frequency range of an alternating current impedance spectrum was 0.1 MHz to 1.0 MHz, and a voltage of an alternating current excitation signal was 5 mV. A test temperature was approximately 25° C., and a constant temperature oil bath of JULABO F12 was used to control the test temperature to be within an error range of ±0.1° C. Results were shown in Table 2.

2. Combustion Performance Evaluation of the Electrolyte

A self-extinguishing time (Self-extinguishing time, SET for short) method was used to evaluate combustibility of the electrolyte. Specific steps were as follows: A glass wool ball with a diameter of approximately 3 to 5 mm was created by using glass fiber wool as a raw material, and was placed on a wire mesh. Syringes were separately used to extract electrolytes including different amounts of additives, and the electrolytes were injected into the glass wool ball. The glass wool ball was quickly ignited, and ignition time was controlled to be 2s. A difference between weighed masses of the syringe before and after the injection was obtained, and time from removal of an ignition apparatus to self-extinguishing of a flame was recorded. Such time was referred to as the self-extinguishing time. Self-extinguishing time per unit mass of the electrolyte was used as a standard, and flame retardancy properties of the electrolytes with the different amounts of additives were compared. Results were shown in Table 2.

II. Performance Test of the Lithium-Ion Battery
1. First-Cycle Specific Discharge Capacity and First-Cycle Efficiency Test of the Lithium-Ion Battery A prepared lithium-ion battery was charged at a constant current of 1.5 mA/cm$^2$ at 25° C. to 4.25 V, and then was charged at a constant voltage of 4.25 V until the current dropped to 0.3 mA/cm$^2$, and a first-cycle specific charge capacity (Ca) was obtained. Then the prepared lithium-ion battery was discharged at a constant current of 1.5 mA/cm$^2$ to 3.0 V, a first-cycle specific discharge capacity ($C_{d1}$) was obtained, and a first-cycle efficiency of the lithium-ion battery was calculated based on the following formula.

First-cycle efficiency of a lithium-ion battery=first-cycle specific discharge capacity ($C_{d1}$)/first-cycle specific charge capacity ($C_{c1}$).

In Example 16, a charge cut-off voltage of a battery with a lithium iron phosphate positive electrode was set to 4.0 V

2. Energy Density Test of the Lithium-Ion Battery

The prepared lithium-ion battery was charged at a constant current of 1.5 mA/cm$^2$ at 25° C. to 4.25 V, and then was charged at a constant voltage of 4.25 V until the current dropped to 0.3 mA/cm$^2$. Then the prepared lithium-ion battery was discharged at a constant current of 1.5 mA/cm$^2$ to 3.0 V (each group included 5 batteries), energy of the lithium-ion battery was measured, and an energy density of the lithium-ion battery was calculated based on the following formula.

Energy density (Wh/kg)=energy of a battery/mass of the battery

Results were shown in Table 2.

3. Capacity Retention Rate Test of the Lithium-Ion Battery

The lithium-ion battery was charged to 4.25 V at a constant current of 1.5 mA/cm$^2$ at 25° C., and then was charged at a constant voltage of 4.25 V until the current dropped to 0.3 mA/cm$^2$. Then the lithium-ion battery was discharged at a constant current of 1.5 mA/cm$^2$ to 3.0 V, and a first-cycle specific discharge capacity ($C_{d1}$) was obtained; and the lithium-ion battery was repeatedly charged and discharged for n cycles, and a specific discharge capacity of the lithium-ion battery after the n cycles was obtained and denoted as $C_{dn}$. A capacity retention rate of the lithium-ion battery was calculated based on the following formula.

Capacity retention rate=specific discharge capacity ($C_{dn}$) after $n$ cycles/first-cycle specific discharge capacity ($C_{d1}$).

Results were shown in Table 2.

4. Observation of a Surface of a Lithium Metal Negative Electrode Plate

The lithium-ion battery after 100 cycles was disassembled, and surface morphology of the lithium metal negative electrode plate was observed by using an optical microscope, to observe whether lithium dendrites were formed. Results were shown in Table 2.

TABLE 2

Performance evaluation of electrolytes and lithium-ion batteries in Examples 1 to 18 and Comparative Examples 1 and 2

| Number | Conductivity (mS/cm) | SET evaluation (s) | Energy density (Wh/kg) | First-cycle specific capacity (mAh/g) | First-cycle efficiency (%) | Capacity retention rate after 200 cycles (%) | Dendrite |
|---|---|---|---|---|---|---|---|
| Example 1 | 9.45 | 19 | 393 | 194 | 95.8 | 92.8 | None |
| Example 2 | 9.70 | 287 | 379 | 187 | 87.7 | 87.2 | Mild |
| Example 3 | 9.65 | 36 | 389 | 192 | 91.3 | 88.0 | None |
| Example 4 | 9.11 | 11 | 377 | 186 | 90.3 | 81.2 | None |
| Example 5 | 8.85 | 3 | 350 | 173 | 85.3 | 80.3 | None |
| Example 6 | 9.14 | 13 | 397 | 196 | 96.2 | 93.4 | None |
| Example 7 | 9.18 | 0 | 385 | 190 | 92.2 | 88.4 | None |
| Example 8 | 8.89 | 0 | 397 | 196 | 97.1 | 91.3 | None |
| Example 9 | 9.42 | 21 | 387 | 191 | 94.6 | 91.1 | None |
| Example 10 | 9.15 | 22 | 375 | 185 | 92.5 | 88.6 | None |
| Example 11 | 8.84 | 27 | 350 | 173 | 87.4 | 77.5 | None |
| Example 12 | 9.27 | 23 | 389 | 192 | 91.8 | 90.1 | None |
| Example 13 | 8.78 | 28 | 371 | 183 | 88.3 | 87.4 | None |

TABLE 2-continued

Performance evaluation of electrolytes and lithium-ion batteries in Examples 1 to 18 and Comparative Examples 1 and 2

| Number | Conductivity (mS/cm) | SET evaluation (s) | Energy density (Wh/kg) | First-cycle specific capacity (mAh/g) | First-cycle efficiency (%) | Capacity retention rate after 200 cycles (%) | Dendrite |
| --- | --- | --- | --- | --- | --- | --- | --- |
| Example 14 | 9.13 | 32 | 377 | 186 | 88.7 | 88.7 | None |
| Example 15 | 9.11 | 32 | 369 | 182 | 83.8 | 83.5 | None |
| Example 16 | 9.01 | 21 | 277 | 151 | 98.7 | 92.1 | None |
| Example 17 | 8.31 | 20 | 308 | 152 | 92.6 | 86.8 | None |
| Example 18 | 5.87 | 21 | 393 | 194 | 94.8 | 92.8 | None |
| Comparative Example 1 | 9.73 | 316 | 373 | 184 | 83.5 | 59.2 | Severe |
| Comparative Example 2 | 9.35 | 274 | 381 | 188 | 87.2 | 73.9 | Moderate |

The following could be learned from the foregoing Table 1 and Table 2.

(1) Compared with Comparative Example 1, specific additives in this application were added to the electrolytes in Examples 1 to 18, and therefore, the flame retardancy of the battery could be effectively improved, and a safety risk of the battery was reduced.

(2) Compared with Comparative Example 1, the electrolytes in Examples 1 to 18 included the specific additives in this application, and therefore, the first-cycle efficiency of the battery could be effectively improved, and the lithium dendrite status of the lithium-ion battery after 200 cycles was significantly suppressed. This indicated that the additives helped improve interface formation and lithium deposition morphology on the surface of the lithium metal negative electrode, and could effectively inhibit generation of the lithium dendrites during battery cycling and improve cycle performance.

(3) It could be learned, by comparing Comparative Examples 1 and 2, and Examples 1 to 5, that with increase of the additive content, the surface film of the lithium negative electrode gradually changed, and the lithium dendrites existing at the end of the cycle obviously vanished. Although the conductivity of the electrolyte decreased to some extent and the battery performance correspondingly decreased, but the conductivity of the electrolyte and the battery performance were still better than those in Comparative Examples 1 and 2.

(4) It could be learned, by comparing Example 1, Example 7, and Example 8, and Comparative Example 1, that further adding another conventional functional additive, such as TEP, including F, phosphate, and the like to the electrolyte system could further improve the flame retardancy function.

(5) It could be learned, by comparing Examples 9 to 15, and Examples 16 to 18, that adding another additive with a similar structure in this application could also improve the flame retardancy and inhibit generation of the lithium dendrites, which is conducive to safety and cycle stability of the battery. This was also applicable to another lithium-ion battery system.

Based on the disclosure and instruction of this specification, a person skilled in the art may further make changes or modifications to the foregoing implementations. Therefore, this application is not limited to the foregoing disclosed and described specific implementations, and some changes or modifications made to this application shall also fall within the protection scope of the claims of this application. In addition, although some specific terms are used in this application, these terms are used only for ease of description, and do not constitute any limitation on this application.

What is claimed is:

1. An electrolyte for a lithium-ion battery, comprising:
an organic solvent;
an electrolyte lithium salt dissolved in the organic solvent; and
an additive;
wherein the additive is a compound represented by following formula I:

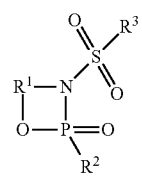

formula I wherein
$R^1$ is a C1-10 alkylidene group, and optionally, one or more hydrogen atoms in the alkylidene group is substituted with one or more of phenyl, halogen, nitrogen, oxygen, sulfur, silicon, boron, or phosphorus;
$R^2$ and $R^3$ each are independently selected from halogen, a saturated or unsaturated C1-10 alkyl group or alkoxy group, R—$NR^4$—, or —$R^1$—$NR^4R^5$, and optionally, one or more hydrogen atoms in the saturated or unsaturated alkyl group or alkoxy group is substituted with one or more of halogen, nitrogen, oxygen, sulfur, silicon, boron, or phosphorus; and
R is a saturated or unsaturated C1-10 alkyl group, optionally, one or more hydrogen atoms in the saturated or unsaturated alkyl group is substituted with one or more of halogen, nitrogen, oxygen, sulfur, silicon, boron, or phosphorus, and $R^4$ and $R^5$ each are independently selected from H or halogen.

2. The electrolyte according to claim 1, wherein $R^1$ in the compound of the formula I is selected from a C1-4 alkylidene group, and optionally, one or more hydrogen atoms in the alkylidene group is substituted with one or more of phenyl, fluorine, chlorine, bromine, iodine, nitrogen, oxygen, sulfur, silicon, boron, or phosphorus.

3. The electrolyte according to claim 2, wherein $R^1$ in the compound of the formula I is selected from —$CH_2$—, —$CH_2CH_2$—, —$CH_2CH_2CH_2$—, —$CH_2(CH_2)_2CH_2$—, or —$CH_2$—CHPh-.

4. The electrolyte according to claim 1, wherein $R^2$ and $R^3$ in the compound of the formula I each are independently selected from F, Cl, Br, a C1-4 alkyl group or alkoxy group, $R—NR^4—$, or $—R^1—NR^4R^5$, and optionally, one or more hydrogen atoms in the alkyl group or alkoxy group is substituted with one or more of fluorine, chlorine, bromine, iodine, nitrogen, oxygen, sulfur, silicon, boron, or phosphorus; and R is independently selected from a C1-4 alkyl group, and $R^4$ and $R^5$ each are independently selected from H.

5. The electrolyte according to claim 4, wherein $R^2$ and $R^3$ in the compound of the formula I each are independently selected from F, Cl, —CH$_3$, —CH$_2$CH$_3$, —CH$_2$CH$_2$CH$_3$, —CH$_2$(CH$_2$)$_2$CH$_3$, —OCH$_3$, —OCH$_2$CH$_3$, —OCH$_2$CH$_2$CH$_3$, —OCH$_2$(CH$_2$)$_2$CH$_3$, —CF$_3$, —CF$_2$CF$_3$, —CF$_2$CF$_2$CF$_3$, —CF$_2$(CF$_2$)$_2$CF$_3$, —CH$_2$CF$_3$, —CH(CF$_3$)$_2$, CH$_3$NH—, CF$_3$NH—, CH$_3$CH$_2$NH—, CH$_3$(CH$_2$)$_2$NH—, CH$_3$(CH$_2$)$_2$NH—, —CH$_2$NH$_2$, or —CH$_2$CH$_2$NH$_2$.

6. The electrolyte according to claim 5, wherein the compound of the formula I is selected from following compounds:

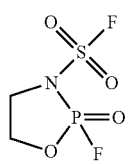
compound I-1

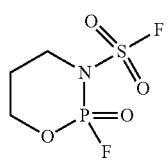
compound I-2

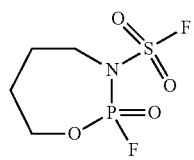
compound I-3

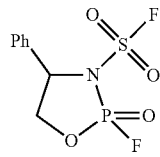
compound I-4

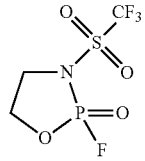
compound I-5

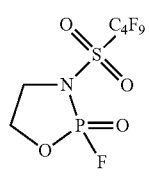
compound I-6

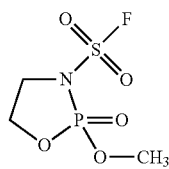
compound I-7

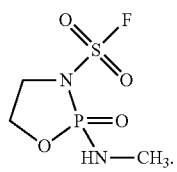
compound I-8

7. The electrolyte according to claim 1, wherein a concentration of the compound of the formula I in the electrolyte is 0.1 wt % to 15 wt %.

8. The electrolyte according to claim 7, wherein a concentration of the compound of the formula I in the electrolyte is 0.5 wt % to 10 wt %.

9. The electrolyte according to claim 1, wherein the electrolyte lithium salt is selected from at least one of LiPF$_6$, LiBF$_4$, LiTFSI, LiFSI, LiClO$_4$, LiAsF$_6$, LiPO$_2$F$_2$, LiBOB, LiDFOB, LiTFOP, LiN(SO$_2$R$_F$)$_2$, or LiN(SO$_2$F)(SO$_2$R$_F$), wherein a substituent group R$_F$=C$_n$F$_{2n+1}$, and n is an integer from 1 to 10.

10. The electrolyte according to claim 9, wherein the electrolyte salt is selected from at least one of LiTFSI and LiFSI.

11. The electrolyte according to claim 9, wherein a concentration of the electrolyte lithium salt in the electrolyte is 0.5 mol/L to 10 mol/L.

12. The electrolyte according to claim 11, wherein a concentration of the electrolyte lithium salt in the electrolyte is 1 mol/L to 5 mol/L.

13. The electrolyte according to claim 1, wherein the electrolyte further comprises at least one of a solid electrolyte interface (SEI) film forming additive, a flame retardancy additive, an overcharge protection additive, and a conductive additive.

14. A lithium-ion battery, comprising a positive electrode, a negative electrode, a separator provided between the positive electrode and the negative electrode, and the electrolyte according to claim 1;

optionally, the positive electrode comprises a positive active material represented by formula II:

$$Li_{1+x}Ni_aCo_bM_{1-a-b}O_{2-y}A_y \qquad (II),$$

wherein $0.1 \leq x \leq 0.2$, $0 < a < 1$, $0 \leq b < 1$, $0 < a+b < 1$, $0 \leq y < 0.2$, M is selected from at least one of Mn, Fe, Cr, Ti, Zn, V, Al, Zr, or Ce, and A is selected from S, N, F, Cl, Br, or I.

15. The lithium-ion battery according to claim 14, wherein $0.5 \leq a < 1$.

16. The lithium-ion battery according to claim 14, wherein $0.6 \leq a < 1$, M is selected from Mn and Al, and A is selected from S and F.

17. An apparatus, comprising the lithium-ion battery according to claim 14, wherein the lithium-ion battery is used as a power supply for the apparatus.

18. The apparatus according to claim 17, wherein the apparatus comprises an electric vehicle, a hybrid electric vehicle, a plug-in hybrid electric vehicle, an electric bicycle, an electric scooter, an electric golf cart, an electric truck, an electric vessel, or an energy storage system.

* * * * *